United States Patent
Güntherberg et al.

(10) Patent No.: US 6,579,937 B1
(45) Date of Patent: Jun. 17, 2003

(54) THERMOPLASTIC MOULDING MATERIALS

(75) Inventors: Norbert Güntherberg, Speyer (DE); Josef Wünsch, Schifferstadt (DE); Peter Ittemann, Lampertheim (DE); Konrad Knoll, Ludwigshafen (DE); Norbert Niessner, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/868,516

(22) PCT Filed: Dec. 16, 1999

(86) PCT No.: PCT/EP99/10016
§ 371 (c)(1),
(2), (4) Date: Jun. 18, 2001

(87) PCT Pub. No.: WO00/36010
PCT Pub. Date: Jun. 22, 2000

(30) Foreign Application Priority Data

Dec. 16, 1998 (DE) .......................... 198 58 141

(51) Int. Cl.⁷ ..................... C08L 25/08; C08L 51/04; C08L 53/02; C08L 69/00
(52) U.S. Cl. ................ 525/67; 525/68; 525/71
(58) Field of Search ................ 525/71, 67, 68

(56) References Cited

U.S. PATENT DOCUMENTS 5,760,134 A    6/1998   Guntherberg
5,814,702 A    9/1998   Avakian
6,235,839 B1 * 5/2001   Guntherberg et al.

FOREIGN PATENT DOCUMENTS

DE    019638256 A1 *  3/1998
EP    483 916          5/1992
EP    791 631          8/1997

* cited by examiner

Primary Examiner—Jeffrey Mullis
(74) Attorney, Agent, or Firm—Keil & Weinkauf

(57) ABSTRACT

Thermoplastic molding compositions comprising
(A) 5 to 98%-wt., based on components (A) through (E), of at least one elastomeric graft copolymer,
(B) 1 to 90%-wt., based on components (A) through (E), of a further copolymer,
(C) 1 to 70%-wt., based on components (A) though (D), of an elastomeric block copolymer composed of
  at least one block $C_A$ (hard phase) having copolymerized units of a vinylaromatic monomer, and
  at least one elastomeric block $C_{(B/A)}$ (soft phase) having copolymerized units of a vinylaromatic monomer, and of a diene,
(D) 0 to 300%-wt., based on components (A) through (C), of a polycarbonate, and
(E) 0 to 30%-wt., based on components (A) through (E), of conventional additives and processing aids,
are useful for producing films, moldings or fibers.

21 Claims, No Drawings

THERMOPLASTIC MOULDING MATERIALS

The present invention relates to thermoplastic molding compositions with improved processing properties, based on graft copolymers and on block copolymers.

Mixtures of impact-modified thermoplastic copolymers based on vinylaromatic polymers and graft rubbers are known to the skilled worker as ABS polymers or ASA polymers, and are commercially available. Blends of these ASA polymers or ABS polymers with other thermoplastics, in particular with polycarbonates, are also known.

The introduction of ever faster processing machinery means that products of this type are required to have, in particular, high flowability during injection molding and capability for demolding without breakage. In thermoforming a particularly important factor is high elongation at break.

In order to optimize these properties, use is generally made of various additives, but these often improve only one property while adversely affecting another desired property. For example, additives for improving flowability and thermoforming properties often lead to losses of mechanical properties, while additives for improving the moldability frequently impair flowability.

U.S. Pat. No. 5,760,134 discloses thermoplastic molding compositions made from (A) a graft copolymer made from an elastomeric polyacrylate graft core with a graft shell, (B) a thermoplastic polymer built up from styrene and/or α-methylstyrene, and, where appropriate, acrylonitrile and, where appropriate, other monomers, and (C) an elastomeric block copolymer built up from at least one block A formed from vinylaromatic monomer units and forming the hard phase and/or a block B formed from diene monomers and forming a first elastomeric (soft) phase, and at least one elastomeric block B/A formed from vinylaromatic monomers and also from diene monomers and forming a soft phase.

The proportion of 1,2-linkages in the polydiene within the block B/A of component C is not disclosed in U.S. Pat. No. 5,760,134.

It is an object of the present invention, therefore, to provide thermoplastic molding compositions based on ABS polymers or on ASA polymers and having a balanced property profile.

We have found that this object is achieved, in one first embodiment of the invention, by way of thermoplastic molding compositions comprising (A) from 5 to 98% by weight, based on the total weight of the molding composition, of an elastomeric graft copolymer built up from
  ($a_1$) from 30 to 90% by weight, based on (A), of a graft base with a glass transition temperature ($T_g$) below −10° C. made from
    ($a_{11}$) an at least partially crosslinked acrylate polymer formed from
      ($a_{111}$) from 50 to 99.9% by weight, based on ($a_{11}$), of at least one $C_1$–$C_{10}$-alkyl acrylate,
      ($a_{112}$) from 0.1 to 5% by weight, based on ($a_{11}$), of at least one polyfunctional crosslinking monomer and
      ($a_{113}$) from 0 to 49.9% by weight, based on ($a_{11}$), of a further monomer which is copolymerizable with ($a_{111}$) selected from the group consisting of the vinyl $C_1$–$C_8$-alkyl ethers, butadiene, isoprene, styrene, acrylonitrile and methacrylonitrile, and/or methyl methacrylate and/or
  ($a_{12}$) a diene polymer built up from
    ($a_{121}$) from 60 to 100% by weight, based on ($a_{12}$), of at least one diene and
    ($a_{122}$) from 0 to 40% by weight, based on ($a_{12}$), of further copolymerizable monomers selected from the group consisting of the $C_1$–$C_{10}$-alkyl acrylates, vinyl $C_1$–$C_8$-alkyl ethers, butadiene, isoprene, styrene, acrylonitrile and methacrylonitrile, and/or methyl methacrylate,
  ($a_2$) from 10 to 70% by weight, based on (A), of a graft with a ($T_g$) above 50° C., grafted onto the graft base and built up from
    ($a_{21}$) from 50 to 95% by weight, based on ($a_2$), of at least one vinylaromatic monomer,
    ($a_{22}$) from 5 to 50% by weight, based on ($a_2$), of at least one polar, copolymerizable comonomer selected from the group consisting of acrylonitrile, methacrylonitrile, $C_1$–$C_4$-alkyl (meth)acrylates, maleic anhydride and maleimides, and (meth) acrylamide, and/or vinyl $C_1$–$C_8$-alkyl ethers, or a mixture of these, (B) from 1 to 90% by weight, based on the total weight of the molding composition, of a copolymer composed of
  ($b_1$) from 50 to 99% by weight, based on (B), of at least one vinylaromatic monomer and
  ($b_2$) from 1 to 50% by weight, based on (B), of monomers as described for ($a_{22}$), (C) from 1 to 70% by weight, based on (A), (B), (C) and, where appropriate, (D) and (E), of an elastomeric block copolymer composed of at least one block $C_A$ forming a hard phase and having copolymerized units of a vinylaromatic monomer, and
  at least one elastomeric block $C_{(B/A)}$ forming a soft phase and having copolymerized units of a vinylaromatic monomer, and also of a diene,
  where the glass transition temperature ($T_g$) of the block $C_A$ is above 25° C. and that of the block $C_{(B/A)}$ is below 25° C., and
  the selected phase-volume ratio of block $C_A$ to block $C_{(B/A)}$ is such that the proportion of the hard phase in the entire block copolymer is from 1 to 40% by volume and the proportion by weight of the diene in the entire block copolymer is less than 50% by weight,
  where the proportion of 1,2-linkages in the polydiene, based on the total of 1,2- and 1,4-cis/trans linkages, is below 15%,
and
(D) from 0 to 300% by weight, based on the weight of components (A) to (C), of a polycarbonate,
(E) from 0 to 30% by weight, based on the total weight of the molding composition, of conventional additives and processing aids.

The thermoplastic molding compositions of the invention have better flowability than comparable molding compositions together with better demoldability and thermoformability and show no reduction in coatability and are largely free from constituents which vaporize or exude.

They are suitable for producing films, moldings (especially sheets) and fibers, with excellent capability for further processing by thermoforming, and also for producing injection moldings, especially for fast processing with short cycle times.

If (A) is a butadiene rubber they have excellent puncture resistance and markedly improved notch impact strength. If (A) is an acrylate rubber, very good impact strength is a particularly remarkable feature.

Many demanding applications require good processability, high flowability, good demoldability and good impact strength of the finished part with respect to initiated or non-initiated fracture, together with good multiaxial impact strength (implying that the impact strength of the molding is good in every direction, with no directional preference), without any substantial impairment of other properties, such as heat resistance, stiffness and flexural strength.

To improve flowability it is usual to add lubricants, often with a reduction in the rubber content. Products with a low rubber content flow better than products of the same type with high rubber content, which have good impact strength but poor flowability. Simultaneous improvement in impact strength and flowability cannot be obtained simply by changing the rubber content.

A further object of the present invention is therefore to provide thermoplastic molding compositions based on ABS polymers or on ASA polymers, in particular on ABS polymers, with better flowability and impact strength than those of conventional materials and moreover with better demoldability, together with paler intrinsic color.

We have found that this object is achieved by way of another embodiment of the present invention. This embodiment provides thermoplastic molding compositions comprising (A) from 5 to 98.9% by weight, based on the total weight of the molding composition, of an elastomeric graft copolymer built up from ($a_1$) from 30 to 90% by weight, based on (A), of a graft base with a glass transition temperature ($T_g$) below −10° C. made from ($a_{11}$) an at least partially crosslinked acrylate polymer formed from ($a_{111}$) from 50 to 99.9% by weight, based on ($a_{11}$), of at least one $C_1$–$C_{10}$-alkyl acrylate, ($a_{112}$) from 0.1 to 5% by weight, based on ($a_{11}$), of at least one polyfunctional crosslinking monomer and ($a_{113}$) from 0 to 49.9% by weight, based on ($a_{11}$), of at least one further monomer which is copolymerizable with ($a_{111}$) selected from the group consisting of the vinyl $C_1$–$C_8$-alkyl ethers, butadiene, isoprene, styrene, acrylonitrile and methacrylonitrile, and/or methyl methacrylate and/or ($a_{12}$) a diene polymer built up from ($a_{121}$) from 60 to 100% by weight, based on ($a_{12}$), of at least one diene and ($a_{122}$) from 0 to 40% by weight, based on ($a_{12}$), of further copolymerizable monomers selected from the group consisting of the $C_1$–$C_{10}$-alkyl acrylates, $C_1$–$C_8$-alkyl vinyl ethers, butadiene, isoprene, styrene, acrylonitrile and methacrylonitrile, and/or methyl methacrylate, ($a_2$) from 10 to 70% by weight, based on (A), of a graft with a glass transition temperature ($T_g$) above 50° C., grafted onto the graft base and built up from ($a_{21}$) from 65 to 95% by weight, based on ($a_2$), of at least one vinylaromatic monomer, ($a_{22}$) from 5 to 35% by weight, based on ($a_2$), of at least one polar, copolymerizable comonomer selected from the group consisting of acrylonitrile, methacrylonitrile, $C_1$–$C_4$-alkyl (meth)acrylates, maleic anhydride and maleimides, and (meth)acrylamide, and/or vinyl $C_1$–$C_8$-alkyl ethers, or a mixture of these, (B) from 1 to 90% by weight, based on the total weight of the molding composition, of a copolymer composed of ($b_1$) from 69 to 81% by weight, based on (B), of at least one vinylaromatic monomer and ($b_2$) from 19 to 31% by weight, based on (B), of monomers as described for ($a_{22}$), (C) from 1 to 70% by weight, based on (A), (B), (C) and, where appropriate, (D) and (E), of an elastomeric block copolymer composed of at least one block $C_A$ forming a hard phase and having copolymerized units of a vinylaromatic monomer, and at least one elastomeric block $C_{(B/A)}$ forming a soft phase and having copolymerized units of a vinylaromatic monomer, and also of a diene, where the glass transition temperature ($T_g$) of the block $C_A$ is above 25° C. and that of the block $C_{(B/A)}$ is below 25° C., and the selected phase-volume ratio of block $C_A$ to block $C_{(B/A)}$ is such that the proportion of the hard phase in the entire block copolymer is from 1 to 40% by volume and the proportion by weight of the diene in the entire block copolymer is less than 50% by weight, where the proportion of 1,2-linkages in the polydiene, based on the total of 1,2- and 1,4-cis/trans linkages, is below 15%, and (D) from 0 to 300% by weight, based on the weight of components (A) to (C), of a polycarbonate, of S-MA copolymers (styrene-maleic anhydride copolymers), of S-imide-MA copolymers (styrene-imide-maleic anhydride copolymers), of S-imide-AN-MA copolymers (styrene-imide-acrylonitrile-maleic anhydride copolymers), of a polymethacrylimide, or of a polymethacrylate, and (E) from 0 to 30% by weight, based on the total weight of the molding composition, of conventional additives and processing aids.

In this embodiment it is preferable to use a diene polymer ($a_{12}$) as graft base ($a_1$). It is particularly preferable to use a butadiene polymer, and it is very particularly preferable for a butadiene polymer to be used and for the proportion of component C to be from 0.1 to 15% by weight, based on (A), (B), (C) and, where appropriate, (D) and (E).

The flowability and the impact strength of the molding compositions of the invention, in particular of those based-on ABS, i.e. those in which a diene polymer ($a_{12}$) is used as graft base ($a_1$) can be significantly improved even with small amounts of component C. This is particularly the case if the content of component ($b_2$) in the copolymer (B) used is in the range from 19 to 31% by weight, based on component (B).

Besides improved flowability and impact strength with respect to initiated and to non-initiated fracture, even at small proportions of component C, good demoldability is achieved with very pale intrinsic color. On extrusion to give sheets, the molding compositions of this embodiment of the invention have a substantial improvement in impact strength perpendicular to the extrusion direction as a result of addition of component (C).

The molding compositions of this embodiment of the invention are therefore particularly suitable for producing moldings, sheets, profiles, pipes and fibers, which can give excellent results in further processing via thermoforming, and also for producing injection-molded parts, in particular where there is fast processing with short cycle times and where there are high requirements placed upon the mechanical properties of the finished part.

In the first embodiment, component (A) of the molding compositions of the invention comprises from 5 to 98% by weight, preferably from 10 to 90% by weight, and in particular from 15 to 80% by weight, based on the total weight of the molding compositions, of an elastomeric graft copolymer.

In the second embodiment, component (A) of the molding compositions of the invention comprises from 5 to 98.9% by weight, preferably from 5 to 98% by weight, and in particular from 10 to 90% by weight, and very particularly preferably from 15 to 80% by weight, based on the total weight of the molding compositions, of at least one elastomeric graft copolymer.

This graft copolymer (A) has been built up from a graft base $(a_1)$ with a glass transition temperature $T_g$ below $-10°$ C. and from a graft $(a_2)$ with a glass transition temperature $T_g$ above $50°$ C., the quantitative proportion of the graft base $(a_{11})+(a_{12})$ being from 30 to 90% by weight, preferably from 35 to 85% by weight, and in particular from 40 to 80% by weight, and the graft $(a_2)$ correspondingly making up from 10 to 70% by weight, preferably from 15 to 65% by weight, and in particular from 20 to 60% by weight.

The structure of the graft copolymer (A) is described in more detail below.

The graft base $(a_1)$ has been built up from ($a_{11}$) an at least partially crosslinked acrylate polymer formed from
- ($a_{111}$) from 50 to 99.9% by weight, based on $(a_{11})$, of at least one $C_1$–$C_{10}$-alkyl acrylate,
- ($a_{112}$) from 0.1 to 5% by weight, based on $(a_{11})$, of at least one polyfunctional crosslinking monomer and
- ($a_{113}$) from 0 to 49.9% by weight, based on $(a_{11})$, of at least one further monomer which is copolymerizable with $(a_{111})$ selected from the group consisting of the vinyl $C_1$–$C_8$-alkyl ethers, butadiene, isoprene, styrene, acrylonitrile and methacrylonitrile, and/or methyl methacrylate and/or ($a_{12}$) a diene polymer built up from
- ($a_{121}$) from 60 to 100% by weight, based on $(a_{12})$, of one or more dienes and
- ($a_{122}$) from 0 to 40% by weight, based on $(a_{12})$, of other copolymerizable monomers selected from the group consisting of the vinyl $C_1$–$C_8$-alkyl ethers, $C_1$–$C_{10}$-alkyl acrylates, isoprene, styrene, acrylonitrile and methacrylonitrile, and/or methyl methacrylate.

Molding compositions which may be used are therefore those in which the graft base present in component (A) is either an acrylate polymer $(a_{11})$ alone or a butadiene polymer $(a_{12})$ alone or a mixture of two polymers $(a_{11})$ and $(a_{12})$.

In cases where mixtures made from the polymers $(a_{11})$ and $(a_{12})$ are used, the mixing ratio is not critical but is generally in the range from 4:1 to 1:4, in particular from 1:2 to 2:1.

Preference is given to those thermoplastic molding compositions in which a graft copolymer with a graft base $(a_{12})$ (diene polymer, in particular butadiene polymer) is used as component (A).

The acrylate polymers $(a_{11})$ have been built up from
- ($a_{111}$) from 50 to 99.9% by weight, preferably from 55 to 98% by weight, and in particular from 60 to 90% by weight, based on $(a_{11})$, of at least one $C_1$–$C_{10}$-alkyl acrylate. Preferred acrylates are $C_2$–$C_{10}$-alkyl acrylates, in particular ethyl acrylate, tert-butyl acrylate, isobutyl acrylate, n-butyl acrylate and 2-ethylhexyl acrylate, the two last-mentioned being particularly preferred.
- ($a_{112}$) from 0.1 to 5% by weight, preferably from 0.25 to 4% by weight, and in particular from 0.5 to 3% by weight, based on $(a_{11})$, of crosslinking monomers, for example polyfunctional monomers having at least 2 non-conjugated olefinic double bonds, examples which should be specifically mentioned being ethylene glycol diacrylate, butanediol diacrylate, hexanediol diacrylate, ethylene glycol dimethacrylate, butanediol dimethacrylate, hexanediol dimethacrylate, divinylbenzene, diallyl maleate, diallyl fumarate, diallyl phthalate, triallyl cyanurate, triallyl isocyanurate, tricyclodecenyl acrylate, dihydrodicyclopentadienyl acrylate, triallyl phosphate, allyl acrylate, allyl methacrylate and dicyclopentadienyl acrylate (DCPA) (cf. DE-C 12 60 135).
- ($a_{113}$) from 0 to 49.9% by weight, preferably from 5 to 44.9% by weight, and in particular from 10 to 39.9% by weight, based on $(a_{11})$, of monomers copolymerizable with $(a_{111})$ selected from the group consisting of vinyl $C_1$–$C_8$-alkyl ethers (e.g. vinyl methyl ether, vinyl propyl ether, vinyl ethyl ether), butadiene, isoprene, styrene, acrylonitrile and methacrylonitrile, and/or methyl methacrylate.

The use of comonomers of this type can control the property profile of the polymers $(a_{11})$, e.g. with respect to degree of crosslinking, and in many cases this can be desirable.

Processes for preparing polymers $(a_{11})$ are known to the skilled worker and are described in the literature. Products of this type are also available commercially.

A preparation process which has proven particularly advantageous in some cases is emulsion polymerization, as described in DE-C 12 60 135.

In the preparation of the graft copolymer (A) by the method described in DE-C-12 60 135, the graft base $(a_1)$ is first prepared. If the graft base is to be an acrylate rubber, one or more acrylate(s) $(a_{111})$, a polyfunctional monomer $(a_{112})$ and, if used, another copolymerized monomer $(a_{113})$ are polymerized in aqueous emulsion at from 20 to 100° C., preferably from 50 to 80° C.

The usual emulsifiers, such as the alkali metal salts of alkyl- and alkylarylsulfonic acids, alkyl sulfates, fatty alcohol sulfonates, salts of higher fatty acids having from 10 to 30 carbon atoms, or resin soaps, may be used. Preference is given to the sodium or potassium salts of alkylsulfonic acids or of fatty acids having from 10 to 18 carbon atoms. It is advantageous to employ the emulsifiers in an amount of from 0.5 to 5% by weight, in particular from 0.5 to 2% by weight, based on the total weight of the monomers used for the preparation of the graft base $(a_1)$. A water/monomer ratio of from 2:1 to 0.7:1 is generally used.

Polymerization initiators used are in particular the customary persulfates, e.g. potassium peroxodisulfate, but redox systems are also suitable. The amount of initiators (e.g. from 0.1 to 1% by weight, based on the total weight of the monomers) depends, in a known manner, on the desired molecular weight.

Polymerization auxiliaries which may be used are the usual buffer substances capable of setting a pH of preferably from 6 to 9, e.g. sodium bicarbonate and sodium pyrophosphate, and from 0.1 to 3% by weight of a molecular weight regulator, such as a mercaptan, terpinol or dimeric α-methylstyrene.

The precise polymerization conditions, in particular the type, manner of addition and amount of emulsifier, are determined within the ranges given above so that the resultant latex of the crosslinked acrylate polymer $(a_{11})$ has a $d_{50}$ in the range from about 30 to 1000 nm, preferably from 50 to 900 nm.

The $d_{50}$ of the particle size is defined in the usual way as the ponderal median of the particle size as determined with an analytical ultracentrifuge by the method of W. Scholtan and H. Lange, Kolloid-Z. and Z.-Polymere 250 (1972) pp. 782–796. The ultracentrifuge measurement gives the integral mass distribution of the particle diameter of a specimen. From this it is possible to deduce what percentage by weight of the particles have a diameter which is the same as or less than a particular size. The median particle diameter, also termed $d_{50}$ of the integral mass distribution, is defined as the value at which 50% by weight of the particles have a smaller, and 50% by weight of the particles a larger, diameter than the $d_{50}$.

In place of the acrylate polymers $(a_{11})$, the graft copolymers (A) can also comprise diene polymers $(a_{12})$ as graft base. The polymers $(a_{12})$ are diene copolymers which besides from 60 to 100% by weight, preferably from 70 to 99% by weight, of one or more dienes, preferably butadiene or isoprene, can also comprise up to 40% by weight, preferably from 2 to 30% by weight, of further copolymerizable monomers, suitable examples of which are both the alkyl acrylates described above under $(a_{111})$ and the monomers $(a_{113})$ copolymerizable with $(a_{111})$; for further details, reference may be made to the description at those points.

If the graft core $(a_1)$ is to be a diene polymer, a useful procedure is as follows: the elastomer, the graft base $(a_{12})$, is prepared by polymerizing components $(a_{121})$ and $(a_{122})$ in aqueous emulsion in a manner known per se at from 20 to 100° C., preferably from 50 to 90° C.

Use may be made of the usual emulsifiers, polymerization initiators and other polymerization auxiliaries described above for preparation of acrylate polymer $(a_{11})$, for example buffers and molecular weight regulators, in the amounts mentioned at that juncture.

The specific polymerization conditions selected within the abovementioned ranges for preparing the diene polymer $(a_{12})$, in particular the type, manner of metering, and amount of the emulsifier, are such that the resultant latex of the diene polymer $(a_{12})$ has a $d_{50}$ value (cf. above) in the range from about 50 to 750 nm, preferably in the range from 70 to 600 nm. As an alternative, it is also possible to agglomerate an emulsion polymer with a median particle size in the range from 60 to 150 nm, as described in DE-A 24 279 60, for example.

A graft $(a_2)$ is grafted onto the graft base $(a_{11})$ and/or $(a_{12})$, and is obtained by copolymerizing $(a_{21})$ from 50 to 95% by weight, preferably from 60 to 90% by weight, in particular from 62 to 85% by weight, based on $(a_2)$, of a vinylaromatic monomer, preferably styrene or substituted styrenes of the formula I

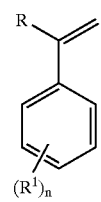

where R is $C_1$–$C_8$-alkyl, hydrogen or halogen and $R^1$ is $C_1$–$C_8$-alkyl or halogen and n is 0, 1, 2 or 3, preferably styrene, α-methylstyrene, p-methylstyrene or tert-butylstyrene, and $(a_{22})$ from 5 to 50% by weight, preferably from 10 to 40% by weight, and in particular from 15 to 38% by weight, based on $(a_2)$, of a polar copolymerizable monomer selected from the group consisting of acrylonitrile, methacrylonitrile, $C_1$–$C_4$-alkyl (meth)acrylates, maleic anhydride and maleimides, (meth)acrylamide and/or vinyl $C_1$–$C_8$-alkyl ethers or mixtures of these.

In the second embodiment of the invention, the proportion of components $(a_{21})$ and $(a_{22})$ in the graft $(a_2)$ is:

$(a_{21})$ from 65 to 95% by weight, preferably from 67 to 90% by weight, and in particular from 70 to 85% by weight, based on $(a_2)$, of an abovementioned vinylaromatic monomer, and $(a_{22})$ from 5 to 35% by weight, preferably from 10 to 33% by weight, and in particular from 15 to 30% by weight, based on $(a_2)$, of an abovementioned polar copolymerizable monomer.

The graft shell $(a_2)$ may be prepared in one or more steps, e.g. in two or three steps, without any resultant effect on its overall makeup.

The graft shell is preferably prepared in emulsion, as described in DE-C 1 260 135, DE-A 32 27 555, DE-A 31 49 357, DE-A 31 49 358 and DE-A 34 14 118, for example.

Depending on the conditions selected, there may be a certain proportion of free copolymers of styrene and acrylonitrile formed in the graft copolymerization.

It is again advantageous to carry out the graft copolymerization onto the polymer which serves as graft base $(a_1)$ in aqueous emulsion. It may be undertaken in the same system used for polymerization of the graft base, further emulsifier and initiator being added if required. These need not be identical with the emulsifiers and initiators used for preparing the graft base $(a_1)$. For example it can be expedient to use a persulfate as initiator for preparing the graft base $(a_1)$ but to employ a redox initiator system for polymerizing the graft shell $(a_2)$. Otherwise, the factors relevant to selection of emulsifier, initiator and polymerization auxiliaries are those given for the preparation of the graft base $(a_1)$.

The monomer mixture to be grafted can be added to the reaction mixture all at once, batchwise in several steps or preferably continuously during the polymerization. The graft copolymerization is advantageously controlled in such a manner that the resulting degree of grafting is from 10 to 60% by weight, preferably from 15 to 55% by weight.

The graft copolymer (A) $((a_1)+(a_2))$ generally has a median particle size of preferably from 30 to 1000 nm, in particular from 100 to 900 nm ($d_{50}$ ponderal median). The conditions for preparing the elastomer $(a_1)$ and for grafting are therefore preferably selected so as to give particle sizes in this range. Measures for this are known and are described, for example, in DE-C-1 260 135 and DE-A 28 26 925 and in Journal of Applied Polymer Science, Vol. 9 (1965), pp.

2929–2938. The particle size increase in the elastomer latex can be achieved, for example, by means of agglomeration.

In some cases, mixtures of several acrylate polymers having different particle sizes have also proven successful. Products of this type are described in DE-A 28 26 925 and U.S. Pat. No. 5,196,480, to which reference may be made at this point for further details.

Preferred mixtures of acrylate polymers are therefore those in which a first polymer has a particle size $d_{50}$ in the range from 50 to 150 nm and a second polymer has a particle size of from 200 to 700 nm, as described in the U.S. Pat. No. 5,196,480 mentioned above.

Preference is also given to the use of mixtures of polymers $(a_{11})$ (as described in DE-A 11 64 080, DE-PS 19 11 882 and DE-A 31 49 358) and polymers $(a_{12})$, where the polymers $(a_{12})$ generally have a median particle size in the range from 30 to 1000 nm, preferably from 100 to 900 nm.

As component (B), the molding compositions of the invention comprise from 1 to 90% by weight, preferably from 5 to 85% by weight, particularly preferably from 10 to 80% by weight, based on the total weight of the molding composition, of a copolymer made from ($b_1$) from 50 to 99% by weight, preferably from 55 to 90% by weight, and in particular from 65 to 85% by weight, based on (B), of vinylaromatic monomers, preferably styrene and/or substituted styrenes of the formula I and ($b_2$) from 1 to 50% by weight, preferably from 10 to 45% by weight, and in particular from 15 to 35% by weight, based on (B), of the monomers described for ($a_{22}$).

In the second embodiment of the invention, the proportion of components ($b_1$) and ($b_2$) in component (B) is:

($b_1$) from 69 to 81% by weight, preferably from 70 to 78% by weight, and in particular from 70 to 77% by weight, based on (B), of the abovementioned vinylaromatic monomers, and ($b_2$) from 19 to 31% by weight, preferably from 22 to 30% by weight, particularly preferably from 23 to 30% by weight, based on (B), of the monomers described for ($a_{22}$), acrylonitrile being particularly preferably used as component ($b_2$).

Products of this type may be prepared by the processes described in DE-A 10 01 001 and DE-A 10 03 436, for example. Copolymers of this type are also available commercially. The average molecular weight determined by light scattering is preferably in the range from 40,000 to 500,000, in particular from 100,000 to 250,000, corresponding to viscosity numbers in the range from 40 to 200 ml/g, preferably from 40 to 160 ml/g (measured on a 0.5% strength by weight solution in dimethylformamide at 25° C.).

The polymer (B) may also be a mixture of various copolymers of styrene or, respectively, α-methylstyrene and acrylonitrile, for example differing in their acrylonitrile content or average molecular weight.

Based on the entirety of components (A), (B), (C) and, where appropriate, (D) and (E) the proportion of component (C) in the molding compositions is from 1 to 70% by weight, preferably from 1 to 50% by weight, and particularly preferably from 1 to 40% by weight.

In the second embodiment of the invention, the proportion of component (C) in the molding compositions, based on the entirety of components (A), (B), (C) and, where appropriate, (D) and (E) is from 0.1 to 70% by weight, preferably from 0.1 to 50% by weight, and particularly preferably from 0.1 to 40% by weight. The proportion of component (C) is very particularly preferably from 0.1 to 15% by weight, in particular from 0.5 to 15% by weight and very particularly from 1 to 15% by weight.

Component (C) is an elastomeric block copolymer made from at least one block $C_A$ forming a hard phase and having copolymerized units of a vinylaromatic monomer, and at least one elastomeric block $C_{(B/A)}$ forming a soft phase and having units of a vinylaromatic monomer, and also of a diene, where the glass transition temperature ($T_g$) of the block $C_A$ is above 25° C., preferably above 50° C., and that of the block $C_{(B/A)}$ is below 25° C., preferably below 50° C., and the selected phase-volume ratio of block $C_A$ to block $C_{(B/A)}$ is such that the proportion of the hard phase in the entire block copolymer is from 1 to 40% by volume and the proportion by weight of the diene is less than 50% by weight, where the proportion of 1,2-linkages in the polydiene, based on the total of 1,2- and 1,4-cis/trans linkages, is below 15%, preferably below 12%.

Detailed information on the structure and preparation of component C has been disclosed in DE-A 19 615 533, which is incorporated here by way of reference.

Preferred vinylaromatic compounds are styrene and also α-methylstyrene, 1,1-diphenylethylene and vinyltoluene, and also mixtures of these compounds. Preferred dienes are butadiene and isoprene, and also piperylene, 1-phenylbutadiene, and also mixtures of these compounds.

A particularly preferred monomer combination is butadiene and styrene.

All of the weight and volume data below are based on this combination. If the industrial equivalents of styrene and butadiene are used, the data has to be converted appropriately where necessary.

An example of the structure of the $C_{(B/A)}$ block is from 75 to 30% by weight of styrene and from 25 to 70% by weight of butadiene. It is particularly preferable for a soft block to have a portion of from 35 to 70% of butadiene and a proportion of from 65 to 30% of styrene.

For the monomer combination styrene/butadiene, the proportion of the diene by weight in the entire block copolymer is from 15 to 65% by weight, and that of the vinylaromatic component is correspondingly from 85 to 35% by weight. Particular preference is given to butadiene-styrene block copolymers having a monomer makeup of from 25 to 60% by weight of diene and from 75 to 40% by weight of vinylaromatic compound.

Examples of a block copolymer C are any of the formulae 1 to 11:

  (1)

  (2)

  (3)

  (4)

  (5)

  (6)

  (7)

  (8)

  (9)

$$Y\text{-}[(C_A\text{-}C_{(B/A)})_n\text{-}C_A]_{m+1} \quad (10)$$

$$Y\text{-}[(C_{(B/A)}\text{-}CA))_n\text{-}C_{(B/A)}]_{m+1} \quad (11)$$

where $C_A$ is the vinylaromatic block and $C_{(B/A)}$ is the soft phase, i.e. the block built up randomly from diene units and from vinylaromatic units, X is the residue of an n-functional initiator, Y is the residue of an m-functional coupling agent, and m and n are natural numbers from 1 to 10.

Preference is given to block copolymers of one of the formulae $C_A\text{-}C_{(B/A)}\text{-}C_A$, $X\text{-}[\text{-}C_{(B/A)}\text{-}C_A]_2$ and $Y\text{-}[\text{-}C_{(B/A)}\text{-}C_A]_2$ (the meaning of the abbreviations being as above), and particular preference is given to a block copolymer whose soft phase subdivides into the following blocks $$C_{(B/A)1}\text{-}C_{(B/A)2} \quad (12)$$

$$C_{(B/A)1}\text{-}C_{(B/A)2}\text{-}C_{(B/A)1} \quad (13)$$

$$C_{(B/A)1}\text{-}C_{(B/A)2}\text{-}C_{(B/A)3} \quad (14)$$

where the blocks have different structures and/or the vinylaromatic/diene ratio in the individual blocks $C_{(B/A)}$ changes in such a way that there is a gradient of makeup $C_{(B/A)p1} \ll C_{(B/A)p2} \ll C_{(B/A)p3} \ldots$ in each subsection (sub-block), the glass transition temperature $T_g$ of each sub-block being below 25° C. Block copolymers of this type, which within one block. $C_{(B/A)}$ have, for example, p repeating sections (sub-blocks) whose monomer build-up varies can be formed by adding the monomers in p portions, p being an integer from 2 to 10. Addition in portions can be useful for controlling the heat flux within the reaction mixture, for example.

Preference is also given to a block copolymer each of whose molecules has two or more blocks $C_{(B/A)}$ and/or $C_A$, each of different molecular weight.

It is also possible for a block $C_B$ to take the place of a block $C_A$ built up exclusively from vinylaromatic units, since the essential point is solely that an elastomeric block copolymer is formed. Examples of structures of copolymers of this type are (15) to (18)

$$C_B\text{-}C_{(B/A)} \quad (15)$$

$$C_{(B/A)}\text{-}C_B\text{-}C_{(B/A)} \quad (16)$$

$$C_{(B/A)1}\text{-}C_B\text{-}C_{(B/A)2} \quad (17)$$

$$C_B[C_{(B/A)1}\text{-}C_{(B/A)2}] \quad (18)$$

The block polymers are prepared by anionic polymerization in a non-polar solvent, with initiation by organometallic compounds. Preference is given to compounds of the alkali metals, particularly of lithium. Examples of initiators are methyllithium, ethyllithium, propyllithium, n-butyllithium, sec-butyllithium and tert-butyllithium. The organometallic compound is in the form of a solution in a chemically inert hydrocarbon when added. The amount added depends on the desired molecular weight of the polymer, but is generally from 0.002 to 5 mol %, based on the monomers. Preferred solvents used are aliphatic hydrocarbons such as cyclohexane or methylcyclohexane.

Within the block copolymer, the random blocks which contain both vinylaromatic and diene are prepared with addition of a soluble potassium salt, in particular of a potassium alkoxide.

It is likely here that the potassium salt enters into metal exchange with the lithium-carbanion ion pair, giving potassium carbanions, which preferentially form adducts with styrene, whereas lithium carbanions preferentially form adducts with butadiene. Since potassium carbanions are significantly more reactive, even a small fraction, specifically from 1/10 to 1/40, is probably sufficient together with the predominant lithium carbanions to render the average incorporation of styrene the same as that of butadiene. It is also possible that during the polymerization procedure there is frequent metal exchange between the living chains, and also between living chains and the dissolved salt, so that the same chain forms an adduct preferentially with styrene on one particular occasion, and subsequently in turn with butadiene. The result is then that the copolymerization parameters for styrene and butadiene are approximately identical.

Particularly suitable potassium salts are potassium alkoxides, and in particular here tertiary alkoxides having at least 7 carbon atoms. Examples of typical alcohols corresponding to these are 3-ethyl-3-pentanol and 2,3-dimethyl-3-pentanol. Tetrahydrolinalool (3,7-dimethyl-3-octanol) has proven particularly suitable. Besides the potassium alkoxides, other potassium salts which are inert to alkyl metal compounds are also suitable in principle. Mention should be made here of potassium dialkylamides, alkylated potassium diarylamides, alkylthiolates and alkylated arylthiolates.

The juncture at which the potassium salt is added to the reaction medium is important. The monomer for the first block and at least some of the solvent are usually present in the initial charge in the reaction vessel. It is not advisable to add the potassium salt at this juncture, since traces of protic contaminants hydrolyze at least some of the salt to give KOH and alcohol, and the potassium ions have then been irreversibly deactivated for the polymerization. The lithium organyl compound should therefore be added first and mixed in, and only then the potassium salt. If the first block is a homopolymer, it is advisable not to add the potassium salt till shortly prior to polymerizing the random block.

The potassium alkoxide may readily be prepared from the corresponding alcohol by stirring a cyclohexane solution in the presence of excess sodium/potassium alloy. After 24 hours at 25° C. evolution of hydrogen has ended, and with this the reaction. However, the reaction time may also be reduced by refluxing at 80° C. for a few hours. A possible alternative reaction involves mixing the alcohol with a small excess of potassium methoxide, potassium ethoxide or potassium tert-butoxide in the presence of a high-boiling inert solvent, such as decalin or ethylbenzene, distilling off the low-boiling alcohol, in this case methanol, ethanol or tert-butanol, diluting the residue with cyclohexane, and filtering off to remove excess low-solubility alkoxide.

Addition of the potassium compound usually achieves a proportion of from 11 to 9% of 1,2-linkages, based on the total of 1,2- and 1,4-linkages in the diene. In contrast, when a Lewis base is used according to DE-A 44 20 952 the values achieved for the proportion of 1,2- and, respectively, 1,4-linkages in the diene units are from 15 to 40% for the 1,2-linkages and from 85–60% for the 1,4-linkages, for example, based in each case on the total amount of copolymerized diene units.

The polymerization temperature may be from 0 to 130° C., preferably from 30 to 100° C.

The proportion of the soft phase built up from diene sequences and from vinylaromatic sequences is from 60 to 95% by volume, preferably from 70 to 90% by volume and particularly preferably from 80 to 90% by volume. The blocks $C_A$ produced from the vinylaromatic monomers form the hard phase, the proportion of which by volume is correspondingly from 5 to 40%, preferably from 10 to 30% and particularly preferably from 10 to 20%.

It should be pointed out that because each of the numeric values has been rounded there is no precise agreement between the abovementioned quantity ratios of vinylaromatic compound and diene, the threshold values of the phase volumes stated above and the makeup implied by the glass transition temperature ranges according to the invention. If this were the case it would be merely coincidental.

The proportion of the two phases by volume can be measured by phase-contrast electron microscopy or solid-state NMR spectroscopy. After osmium degradation of the polydiene fraction, the proportion of the vinylaromatic blocks can be determined by precipitation and weighing. If polymerization is always allowed to proceed to completion, the future phase ratio of a polymer can be calculated from the amounts of monomers employed.

For the purposes of the invention, the block copolymers are unambiguously defined by the quotient calculated from the proportion by volume in percent of the soft phase formed by the $C_{(B/A)}$ blocks and the proportion of diene units in the soft phase, which for the combination styrene/butadiene is from 25 to 70% by weight.

The glass transition temperature ($T_g$) is influenced by the random incorporation of the vinylaromatic compounds into the soft block of the block copolymer and by the use of potassium alkoxides during the polymerization.

The glass transition temperature is typically from −50 to +25° C., preferably from −50 to +5° C. The glass transition temperature of the potassium-catalyzed random copolymers of the invention is on average lower by from 2 to 5° C. than in the case for the corresponding Lewis-base-catalyzed products, since the latter have an increased proportion of butadiene 1,2-linkages. The glass transition temperature of 1,2-polybutadiene is higher by about 70–90° C. than that of 1,4-polybutadiene. The molar mass of the block $C_A$ here is generally from 1000 to 200000, preferably from 3000 to 80000 [g/mol]. $C_A$ blocks within one molecule may have different molar masses.

The molar mass of the block $C_{(B/A)}$ is usually from 2000 to 250000 [g/mol], preferred values being from 5000 to 150000 [g/mol].

Like the blocks $C_A$, blocks $C_{(B/A)}$ may assume different molar mass values within one molecule.

The coupling center X is formed by reaction of the living anionic chain ends with an at least bifunctional coupling agent. Examples of such compounds are found in U.S. Pat. No. 3,985,830, 3,280,084, 3,637,554 and 4,091 053. Preference is given to the use of, for example, epoxidized glycerides, such as epoxidized linseed oil or soybean oil; divinylbenzene is also suitable. Dichlorodialkylsilanes, dialdehydes, such as terephthalaldehyde, and esters, such as ethyl formate or benzoate, are suitable specifically for dimerization.

Preferred polymer structures are $C_A-C_{(B/A)}-C_A$; $X-[-C_{(B/A)}-C_A]_2$ and $Y-[-C_{(B/A)}-C_A]_2$, and the random block $C_{(B/A)}$ may itself have been subdivided here into blocks $C_{(B1/A1)}-C_{(B2/A2)}-C_{(B3/A3)}$ ... The random block is preferably composed of from 2 to 15 random sub-blocks, particularly preferably of from 3 to 10 sub-blocks. The subdivision of the random block $C_{(B/A)}$ into a large number of sub-blocks $C_{Bn/An}$ gives the decisive advantage that the sub-block $C_{(B/A)}$ block overall behaves as an almost perfect random polymer even if there is continuous change (gradient) in its makeup within a sub-block $C_{Bn/An}$, as is difficult to avoid in anionic polymerization under industrial conditions (see below). Clearly, one possibility is to add less than the theoretical amount of potassium alkoxide. Some proportion of the sub-blocks may be given a high diene fraction. This has the effect that the polymer retains a residual impact strength, even below the glass transition temperature of the predominant $C_{(B/A)}$ blocks, and does not become completely brittle.

The property profile of the block copolymers of the invention is very similar to that of plasticized PVC, but they are prepared entirely without the use of low-molecular-weight plasticizers which can migrate. They resist crosslinking under the usual conditions of processing (from 180 to 220° C.). The excellent resistance of the polymers of the invention to crosslinking may be unambiguously proven by rheography. The experimental arrangement corresponds to that for MVR measurement. The rise in pressure as a function of time is recorded at a constant melt flow rate. Even after 20 minutes at 250° C., the polymers of the invention show no rise in pressure and give a smooth extrudate, whereas for a comparative specimen prepared in accordance with DE-A 44 20 952 with tetrahydrofuran the pressure under the same conditions increases by a factor of three and the extrudate has the barbed-wire appearance typically seen when crosslinking occurs.

The polymerization is carried out in two or more stages and in the case of monofunctional initiation, for example, begins with preparing the hard block $C_A$. A portion of the monomers is first placed in the reactor, and the polymerization is initiated by adding the initiator. In order to achieve a specified chain structure which can be calculated from the amounts of monomer and initiator added, it is advisable to take the process to high conversion (above 99%) before the second monomer is added, but this is not an essential requirement.

The sequence of monomer addition depends on the block structure selected. In the case of monofunctional initiation, the vinylaromatic compound is an initial charge, for example, or is directly metered in. A cyclohexane solution of the potassium alkoxide is then added. Diene and vinylaromatic should then be added simultaneously, if at all possible. The addition may take place in two or more portions. The ratio between the amount of diene and that of vinylaromatic compound, and also the concentration of the potassium salt and the temperature, bring about the random structure and determine the makeup of the block $C_{(B/A)}$. The proportion by weight of the diene, relative to the entire weight including vinylaromatic compound, is from 25 to 70%. Block $C_A$ may then be polymerized on by adding the vinylaromatic. As an alternative, polymer blocks required may also be bonded to one another by a coupling reaction. In the case of bifunctional initiation, the $C_{(B/A)}$ block is built up first, followed by the $C_A$ block.

Work-up follows by the usual processes. Procedures which are advisable here are to work in a mixing vessel and to use an alcohol, such as isopropanol, to terminate the polymerization, to use $CO_2$/water in a conventional manner for making the mixture weakly acidic prior to work-up, to stabilize the polymer with an oxidation inhibitor and a free-radical scavenger (commercially available products, such as trisnonylphenyl phosphite (TNPP) or α-tocopherol (vitamin E) and/or products obtainable with the trade name Irganox 1076 or Irganox 3052) to remove the solvent by the usual processes; and extrude and pelletize.

As component (D) the thermoplastic molding compositions of the invention may comprise from 0 to 300% by weight, based on the entirety of (A), (B) and (C), preferably from 0 to 200% by weight, of at least one polycarbonate.

Examples of suitable polycarbonates are those based on diphenols of the formula II

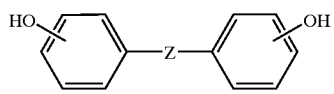

(II)

where Z is a single bond, $C_1$–$C_3$-alkylene, $C_2$–$C_3$-alkylidene, $C_3$–$C_6$-cycloalkylidene, —S— or —$SO_2$.

Preferred diphenols of the formula II are, for example, 4,4'-dihydroxydiphenyl, 2,2-bis(4-hydroxyphenyl)-propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane.

Both homopolycarbonates and copolycarbonates are suitable as component (D); besides bisphenol A homopolymer, preference is also given to copolycarbonates of bisphenol A.

The polycarbonates which are suitable may be branched in a known manner, preferably by the incorporation of from 0.05 to 2.0 mol %, based on the total of the diphenols employed, of at least trifunctional compounds, for example those having three or more phenolic OH groups.

The polycarbonates which are suitable as component (D) may, furthermore, be aromatically mono- to trisubstituted with halogen, preferably with chlorine and/or bromine, but particular preference is given to halogen-free compounds.

Polycarbonates which have proven particularly suitable are those having relative viscosities $\eta_{rel}$ of from 1.10 to 1.50, in particular from 1.25 to 1.40. This corresponds to average molecular weights $M_w$ (weight average) of from 10000 to 200000, preferably from 20000 to 80000.

The diphenols of formula II are known per se or can be prepared by known processes.

The polycarbonates can be prepared, for example, by reaction of the diphenols with phosgene in the interfacial process or with phosgene in the homogeneous phase process (the pyridine process), the molecular weight to be set in each case being achieved in a known manner using an appropriate amount of known chain terminators. (For polycarbonates containing polydiorganosiloxanes see for example DE-A 33 34 782.)

Suitable chain terminators are, for example, phenol, p-tert-butylphenol and long-chain alkylphenols, such as 4-(1,3-tetramethylbutyl)phenol as in DE-A 28 42 005 or monoalkylphenols or dialkylphenols with from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl) phenol and 4-(3,5-dimethylheptyl)-phenol.

Other suitable polycarbonates are those based on hydroquinone or resorcinol.

Besides the components (A), (B), (C) and (D), the thermoplastic molding compositions may also contain additives and processing aids as component E) in amounts of from 0 to 30% by weight, based on the total weight of the molding compositions. Additives and processing aids of this type are lubricants and demolding aids, pigments, dyes, flame retardants, antioxidants, light stabilizers, fillers and reinforcing agents of fibrous or pulverulent character, and antistats, in the amounts usual for these agents.

The molding compositions according to the invention can be prepared by mixing processes known per se, for example by melting in an extruder, Banbury mixer, compounder, roll mill or calender. The components may, however, also be mixed "cold" without melting, and the mixture in the form of a powder or consisting of granules melted and homogenized only at the processing stage.

The present invention therefore also provides a process for preparing the thermoplastic molding compositions of the invention by mixing the components by mixing processes known per se.

From the molding compositions it is possible to produce moldings of any type, in particular films and flat articles. Films may be produced by extrusion, rolling, calendering and other processes known to the person skilled in the art. The molding compositions according to the invention are shaped by heating and/or friction, by themselves or with addition of plasticizing or other additives, to give a film which can be further processed or a flat article (sheet). An example of a method of processing to give three-dimensional moldings of any type is injection molding.

The present invention therefore also provides the use of the thermoplastic molding compositions of the invention for producing moldings, films or fibers. It also provides the moldings obtainable using the thermoplastic molding compositions.

The thermoplastic molding compositions of the invention have better flowability than comparable molding compositions together with better demoldability and thermoformability and show no reduction in coatability and are largely free from constituents which vaporize or exude.

If (A) is a butadiene rubber, the molding compositions have excellent puncture resistance and notch impact strength. If (A) is an acrylate rubber, the very good impact strength is a particular feature which should be highlighted.

They are suitable for producing films, moldings (especially sheets) and fibers, with excellent capability for further processing by thermoforming, and also for producing injection moldings, especially for fast processing with short cycle times.

The molding compositions of the invention are suitable for use in electrical devices, such as kitchen machinery, shavers, telephones, vacuum cleaners, monitor casings, keyboards, electric lawnmowers, toy railroads, washing machines, dishwashers and refrigerators.

The molding compositions of the invention are also suitable for producing automotive parts. An example of their use is in automotive interiors, in center consoles, door side panels, tachometer housings, ventilator nozzles, push buttons and switches. They are also suitable for automotive exterior applications, such as wheel caps, exterior mirrors (pigmented, painted or electroplated), electroplated emblems, radiator grilles and spoilers.

The molding compositions of the invention are also suitable for toys, profile extrusion, pipe extrusion, sheet extrusion, double- and multilayer extrusion and housing parts.

EXAMPLES

The following constituents were prepared (all % data are % by weight)

A: Preparation of Components A

The median particle size mentioned in the description of component (A) is the ponderal median of the particle sizes.

The median diameter corresponds to the $d_{50}$, according to which 50% by weight of all particles have a smaller, and 50% by weight a larger, diameter than the diameter corresponding to the $d_{50}$. In order to characterize the width of the particle size distribution, the $d_{50}$ and the $d_{90}$ are often stated in addition to the $d_{50}$. 10% by weight of all particles are smaller, and 90% by weight are larger, than the $d_{90}$ diameter. Analogously, 90% by weight of all particles have a smaller, and 10% by weight a larger, diameter than the diameter corresponding to the $d_{90}$. The quotient $Q=(d_{90}-d_{10})/d_{50}$ is a measure of the width of the particle size distribution. The smaller Q is, the narrower is the distribution.

A1: Preparation of a Component A-I:

A) Preparation of a Graft Base A-I-1:

The preparation of the respective acrylate-based graft base $((a_{111})+(a_{112}))$ was carried out according to the following general specification:

160 g of a mixture of 98% of butyl acrylate and 2% of dihydrodicyclopentadienyl acrylate (DCPA) were heated to 60° C., with stirring, in 1500 g of water, with addition of 5 g of the sodium salt of a $C_{12}$–$C_{18}$-paraffinsulfonic acid, 3 g of potassium peroxodisulfate, 3 g of sodium bicarbonate and 1.5 g of sodium pyrophosphate. 10 minutes after the initiation of the polymerization, a further 840 g of butyl acrylate were added over 3 hours. After monomer addition had ended, the emulsion was held at 60° C. for a further hour.

b) Preparation of a Particulate Graft Polymer A-I:

2100 g of the emulsion prepared according to specification a) were mixed with 1150 g of water and 2.7 g of potassium peroxodisulfate and heated to 65° C., with stirring. After the reaction temperature was reached, 560 g of styrene/acrylonitrile in a ratio of 75:25 were added over 3 hours. When the addition was complete, the emulsion was held at 65° C. for a further 2 hours. The graft polymer was precipitated from the emulsion using calcium chloride solution at 95° C., washed with water, and dried in a stream of warm air.

A2: Preparation of a Component A-II:

a) Preparation of a Graft Base A-II-1

The preparation of the respective butadiene-based graft base $((a_{121})+(a_{122}))$ was carried out according to the following specification:

A polybutadiene latex is prepared by polymerization at 65° C. of 600 g of butadiene in the presence of 6 g of tert-dodecyl mercaptan, 7 g of sodium $C_{14}$-alkylsulfonate as emulsifier, 2 g of potassium peroxodisulfate and 2 g of sodium pyrophosphate in 800 ml of water. The conversion if 98%. The resultant latex has a median particle size of 100 nm. This latex is agglomerated by adding 25 g of an emulsion of a copolymer of 96 parts of ethyl acrylate and 4 parts of methacrylamide, with a solids content of 10% by weight, giving a polybutadiene latex with a median particle size of 350 nm.

b) Preparation of a Particulate Graft Polymer A-II:

After addition of 400 g of water, 4 g of sodium $C_{14}$-alkylsulfonate and 2 g of potassium peroxodisulfate to the graft base prepared to specification a, 400 g of a mixture of styrene and acrylonitrile (3:1) are introduced over a period of 4 hours. The polymerization takes place at 75° C. while the mixture is stirred. The conversion, based on styrene-acrylonitrile, is practically quantitative. The resultant graft rubber dispersion is precipitated by means of magnesium sulfate solution, and the isolated graft copolymer is washed with distilled water and dried.

A3: Preparation of a Component A-III:

a) Preparation of a Graft Base A-III-1

4312 g of butadiene are polymerized at 65° C. in the presence of 43 g of tert-dodecyl mercaptan, 31.1 g of potassium salt of $C_{12}$–$C_{20}$ fatty acids, 8.2 g of potassium persulfate, 14.7 g of sodium hydrogencarbonate and 5840 g of water to give a polybutadiene latex. The procedure is as described in EP-A 0 062 901. The conversion is 96%, and the median particle size is from 80 to 120 nm.

To agglomerate the latex, 3500 g of the resultant dispersion are mixed at 65° C. with 287 g of a dispersion (solids content 10% by weight) made from 96% by weight of ethyl acrylate and 4% by weight of methacrylamide.

b) Preparation of a Particulate Graft Polymer A-III:

930 g of water, 13 g of potassium salt of $C_{12}$–$C_{20}$ fatty acids and 1.7 g potassium peroxodisulfate are added to the resultant agglomerated latex. 897 g of a mixture of styrene and acrylonitrile (80:20% by weight) are then added within a period of 4 hours. The $d_{50}$ of the particle size distribution of the resultant graft dispersion is from 150 to 350 nm.

A4: Preparation of Componenet A-IV a) Preparation of a Graft Base A-IV-1

4 parts of vinyl methyl ether, 15 parts of butyl acrylate and 15 parts of butadiene are heated to 65° C., with stirring, in 150 parts of water with addition of 1.2 parts of the sodium salt of a paraffinsulfonic acid ($C_{12}$–$C_{18}$), 0.3 part of potassium persulfate, 0.3 part of sodium bicarbonate and 0.15 part of sodium pyrophosphate. Once the polymerization has begun, a mixture made from 43 parts of butyl acrylate and 23 parts of butadiene is added within a period of 5 h. Once all of the monomers have been added, the polymerization mixture held at 65° C. for a further 2 hours. This gives an aqueous dispersion of about 40% strength.

b) Preparation of a Particulate Graft Polymer A-IV 250 parts of the first-stage dispersion (graft base) (A-IV-1) are mixed with 60 parts of a mixture made from styrene and acrylonitrile and sufficient water to form a 40% strength dispersion, and polymerized at 70° C., with stirring.

0.2% of potassium persulfate and 0.3% of lauroyl peroxide—in each case based on the monomer—are added as polymerization initiator and dissolved in the mixture of the monomers.

B: Preparation of Component B

The preparation of component B was carried out by the continuous solution polymerization process as described in Kunststoff-Handbuch, Ed. R. Vieweg and G. Daumiller, Vol. V "Polystyrol", Carl-Hanser-Verlag, Munich 1969, pp. 122–124.

B1: Component B-I:

A copolymer of styrene and acrylonitrile having 35% by weight of acrylonitrile (AN) and a viscosity number of 60 ml/g, measured as 0.5% strength solution in dimethylformamide according to DIN 53726.

B2: Component B-II:

A copolymer of styrene and acrylonitrile having 25% by weight of acrylonitrile and a viscosity number of 64 ml/g, measured as 0.5% strength solution in dimethylformamide according to DIN 53726.

B3: Component B-III:

As component B2, but with a viscosity number of 80 ml/g, measured as 0.5% strength solution in dimethylformamide according to DIN 53726.

B4: Component B-IV:

As B1, but with a viscosity number of 80 ml/g, measured as 0.5% strength solution in dimethylformamide according to DIN 53726.

C: Preparation of Component C

To prepare component C, a 50 liter stainless steel autoclave equipped with a cross-blade agitator and simultaneous heating and cooling facilities was prepared by flushing with nitrogen and scalding with a solution of sec-butyllithium and 1,1-diphenylethylene in a molar ratio of 1:1 in cyclohexane, and drying. 22.8 l of cyclohexane were then charged, and the amounts given in Table 1 of initiator, monomers and potassium alkoxide were added. The polymerization time is also given, as is the initial temperature $T_I$ and final temperature $T_F$, the monomer feed time always being short in relation to the polymerization time.

The temperature of the reaction mixture was controlled by heating or cooling the reactor jacket. Once the reaction had ended (monomers consumed) ethyl formate was titrated in until the mixture was colorless, and the mixture was acidified with a 1.5-fold excess of formic acid. Finally, 34 g of a commercially available stabilizer (®Irganox 3052; Ciba-Geigy, Basle) and 82 g of trisnonylphenyl phosphite were added.

The solution was worked up in a vented extruder (three vents, forward and back venting) at 200° C. The resultant granules were used to prepare the molding composition.

TABLE 1

Polymerization and analysis of an S-SB-S block copolymer (component C)

| sec-buli [mmol] | Styrene 1 [g] $T_I/T_F$ [° C.] Time [min] | K salt [mmol] Li:K ratio | Butadiene 1 [g] Styrene 2 [g] $T_I/T_F$ [° C.] Time [min] | Butadiene 2 [g] Styrene 3 [g] $T_I/T_F$ [° C.] Time [min] | Butadiene 3 [g] Styrene 4 [g] $T_I/T_F$ [° C.] Time [min] | Styrene 5 [g] $T_I/T_F$ [° C.] Time [min] |
|---|---|---|---|---|---|---|
| 87.3 | 1638 40/68 30 | 2.36 37:1 | 1250 1126 52/74 13 | 1250 1126 54/75 13 | 1250 1126 56/75 17 | 1638 70/80 40 |

| $M_n$ [g/mol · $10^{-3}$] $M_p$ [g/mol · $10^{-3}$] $M_w$ [g/mol · $10^{-3}$] | $T_{g,1}$ [° C.] $T_{g,2}$ [° C.] |
|---|---|
| 136 000 158 000 163 000 | −55 to −25 (delta Cp 68%) 60 to 100 (delta Cp 32%) |

The average molar masses (in g/mol) of the polymer were determined by gel permeation chromatography (calibrated against polystyrene). $M_n$ here means number average, $M_v$ means viscosity average, and $M_w$ means weight average.

The glass transition temperatures $T_g$ were determined by DSC and were from −55 to −25° C. for the soft phase and from +60 to +100° C. for the hard phase.

The melt volume index MVI was determined at 200° C. with a load of 5 kg according to DIN 53 735, and was 8.5 ml/10 min.

Thermoplastic Molding Compositions

The molding compositions of the invention and the comparative compositions were prepared at 250° C. and 200 rpm, with 10 kg/h throughput, in a ZSK 30 extruder from Werner and Pfleiderer. The product was cooled in a water bath, pelletized and injection molded on an Arburg Allrounder injection molding machine to give test specimens. Elongation at break was tested according to DIN 53504.

The results for the first embodiment of the present invention are listed in Tables 2 and 3 below.

The results for the second embodiment of the invention are listed in Tables 4 to 8 below.

TABLE 2

| Mixture/component | Unit | 1 | 2 | 3 | 4 | 5 |
|---|---|---|---|---|---|---|
| A3 | % | 40 | 38 | 36 | 34 | 32 |
| B3 | % | 60 | 57 | 54 | 51 | 48 |
| C | % | 0 | 5 | 10 | 15 | 20 |
| MVR 220/10 | cm³/10 min | 3.6 | 4.7 | 6.1 | 8.9 | 13 |
| Breaking stress | MPa | 33 | 29 | 27 | 26 | 24 |
| Yield stress | % | 3.1 | 3.3 | 3.2 | 3.3 | 3.4 |
| Charpy impact strength 23° C. | kJ/m² | no fracture | no fracture | no fracture | no fracture | no fracture |
| Charpy notch impact strength 23° C. | kJ/m² | 32.8 | 34.9 | 40.4 | 43.9 | 47.1 |
| Charpy notch impact strength −30° C. | kJ/m² | 17 | 9 | 10 | 8 | 5 |
| Penetration test | | 25 | 26 | 26 | 26 | 24 |
| Yellowing after exposure to light for 16 h | | +32 | +25 | +27 | +27 | +27 |
| Vicat | ° C. | 96.5 | 94 | 91 | 85 | 80 |

TABLE 3

| Mixture/component | Unit | 11 | 12 | 13 | 14 | 15 |
|---|---|---|---|---|---|---|
| A1 | % | 42 | 39.9 | 37.8 | 35.7 | 33.6 |
| B4 | % | 58 | 55.1 | 52.2 | 49.3 | 46.4 |
| C | % | 0 | 5 | 10 | 15 | 20 |
| MVR 220/10 | cm³/10 min | 4.7 | 4.9 | 7.9 | 8.9 | 13.3 |
| Breaking stress | MPa | 35 | 34 | 31 | 28 | 28 |
| Stress yield % | % | 3.5 | 3.4 | 3.5 | 3.5 | 3.6 |
| Charpy notch impact strength 23° C. | kJ/m² | 46.8 | 48.4 | 49.7 | 28.3 | 22.3 |
| Charpy notch impact strength −30° C. | kJ/m² | 2.3 | 2.3 | 2 | 1.8 | 1.8 |
| Penetration test | | 25 | 25 | 11 | 9 | 9 |
| MT 220° Vicat ° C. | ° C. | 91.5 | 90.5 | 86.2 | 79.3 | 73.4 |

The flowability of the molding compositions was determined on pellets, via the melt flow volume index MVR (melt volume ratio) at 220° C. with a load of 10 kp. The data given are the amounts in ml discharged through a standard die in 10 min.

Charpy impact strength was measured according to ISO 179/1 eU, on tensile specimens of dimension 4 mm.

Charpy notch impact strength was measured on test specimens of dimensions 80×10×4 mm injection molded at 240° C. melt temperature/60° C. mold temperature with milled notch, testing according to ISO 179/1 eA.

Puncture resistance was measured according to ISO 6603.

Heat resistance: determined according to DIN 53 460 as Vicat value, using test method A.

TABLE 4

| Component | ISO test specification | Unit | 1 | 2 | 3 | 4 | 5 | 6 | 7 |
|---|---|---|---|---|---|---|---|---|---|
| A2 | | % | 30 | 29.4 | 28.5 | 27 | 24 | 15 | 6 |
| B1 | | % | 70 | 68.6 | 66.5 | 63 | 56 | 35 | 17 |
| C | | % | 0 | 2 | 5 | 10 | 20 | 50 | 80 |
| Melt volume ratio (220° C./10 kg) | 1133 | cm$^3$/10 min | 16.3 | 16.9 | 18.7 | 23.1 | 34.2 | 73.9 | 74 |
| Vicat softening point VST/B/50 | 306 | ° C. | 101.3 | 100.6 | 99.2 | 97.0 | 99.1 | 59.9 | nm[1] |
| Charpy impact strength at 23° C. | 179/leU | kJ/m$^2$ | 226 | 237 | 276 | 296 | nf[2] | nf[2] | nm[1] |
| Charpy impact strength at −30° C. | 179/leU | kJ/m$^2$ | 82.8 | 93.5 | 105 | 99.4 | 146 | nf[2] | nm[1] |
| Charpy notch impact strength at 23° C. | 179/leA | kJ/m$^2$ | 14.3 | 12.4 | 13.7 | 12.5 | 34 | 31 | nm[1] |
| Charpy notch impact strength at −30° C. | 179/leA | kJ/m$^2$ | 5.4 | 4.6 | 4.5 | 4.1 | 3.8 | 2.7 | — |
| IZOD notch impact strength at 23° C. | 180/1A | kJ/m$^2$ | 18.4 | 13.8 | 14.8 | | | | |
| IZOD notch impact strength at −30° C. | 180/1A | kJ/m$^2$ | 5.4 | 4.5 | 4.3 | | | | |
| Elongation at yield stress | 527-2 | % | 2.9 | 2.9 | 2.9 | 2.9 | 2.9 | 2.5 | 8.4 |
| Nominal elongation at break | 527-2 | % | 7.9 | 9.2 | 10.8 | 14.2 | 21.4 | 117 | 351 |
| Modulus of elasticity in tension | 527-2 | MPa | 2390 | 2330 | 2245 | 2148 | 1745 | 1108 | 298 |
| Flexural strength (max) | 178 | MPa | 74.9 | 72.9 | 69.4 | 63.6 | 47.3 | 26.7 | — |
| Yellowness | | | 48.8 | 48.1 | 47.1 | 44.1 | 41.7 | 34 | 22.4 |

[1] nm: not measurable
[2] nf: no fracture

TABLE 5

| Component | ISO test specification | Unit | 1 | 2 | 3 | 4 | 5 | 6 | 7 |
|---|---|---|---|---|---|---|---|---|---|
| A3 | | % | 30 | 29.4 | 28.5 | 27 | 24 | 15 | 6 |
| B2 | | % | 70 | 68.6 | 66.5 | 63 | 56 | 35 | 17 |
| C | | % | 0 | 2 | 5 | 10 | 20 | 50 | 80 |
| Melt volume ratio (220° C./10 kg) | 1133 | cm$^3$/10 min | 17.2 | 19.8 | 21.5 | 26.1 | 36.5 | 72.8 | nm[1] |
| Vicat softening point VST/B/50 | 306 | ° C. | 96.3 | 95.5 | 94.3 | 90.6 | 83.2 | nm[1] | nm[1] |
| Charpy impact strength at 23° C. | 179/leU | kJ/m$^2$ | 157 | 208 | 221 | 269 | nf[2] | nf[2] | nm[1] |
| Charpy impact strength at −30° C. | 179/leU | kJ/m$^2$ | 101 | 119 | 121 | 124 | 138 | nf[2] | nm[1] |
| Charpy notch impact strength at 23° C. | 179/leA | kJ/m$^2$ | 22.9 | 27.1 | 31.3 | 37.1 | 34.4 | 55.3 | nm[1] |
| Charpy notch impact strength at −30° C. | 179/leA | kJ/m$^2$ | 7.5 | 6.8 | 6.2 | 5.2 | 3.6 | 3.3 | nm[1] |
| IZOD notch impact strength at 23° C. | 180/1A | kJ/m$^2$ | 17.6 | 23.3 | 28.7 | — | — | — | — |
| IZOD notch impact strength at −30° C. | 180/1A | kJ/m$^2$ | 7.6 | 7.3 | 6.7 | — | — | — | — |
| Elongation at yield stress | 527-2 | % | 2.7 | 2.8 | 2.9 | 2.9 | 2.9 | 3.2 | 10.9 |
| Nominal elongation at break | 527-2 | % | 5.2 | 5.7 | 8.7 | 11.6 | 21.4 | 122 | 389 |
| Modulus of elasticity in tension | 527-2 | MPa | 2205 | 2143 | 2063 | 1946 | 1746 | 986 | 251 |
| Flexural strength (max) | 178 | MPa | 65.9 | 63.8 | 60.9 | 55.6 | 47.6 | 22.5 | — |
| Yellowness | | | 27.3 | 26.0 | 24.4 | 23.3 | 21.5 | 15.5 | nm[1] |

[1] nm: not measurable
[2] nf: no fracture

TABLE 6

| Component | ISO test specification | Unit | 1 | 2 | 3 | 4 | 5 |
|---|---|---|---|---|---|---|---|
| A3 | | % | 30 | 29.4 | 28.5 | 27 | 24 |
| B3 | | % | 70 | 68.6 | 66.5 | 63 | 56 |
| C | | % | 0 | 2 | 5 | 10 | 20 |
| Melt volume ratio (220° C./10 kg) | 1133 | cm$^3$/10 min | 6.4 | 7.2 | 8.4 | 11.4 | 18.8 |
| Vicat softening point VST/B/50 | 306 | ° C. | 99.9 | 99.3 | 98.1 | 94.4 | 80 |
| Charpy impact strength at 23° C. | 179/leU | kJ/m$^2$ | 183 | 232 | 221 | 269 | nf[2] |
| Charpy impact Strength at −30° C. | 179/leU | kJ/m$^2$ | 110 | 107 | 92.4 | 137 | 154 |
| Charpy notch impact strength at 23° C. | 179/leA | kJ/m$^2$ | 16.9 | 21.9 | 27.6 | 35.6 | 30.2 |
| Charpy notch impact strength at −30° C. | 179/leA | kJ/m$^2$ | 6.9 | 6.8 | 5.9 | 4.9 | 2.6 |
| IZOD notch impact strength at 23° C. | 180/1A | kJ/m$^2$ | 14.1 | 17.2 | 22.5 | — | — |
| IZOD notch impact strength at −30° C. | 180/1A | kJ/m$^2$ | 6.9 | 6.4 | 5.5 | — | — |
| Elongation at yield stress | 527-2 | % | 3.1 | 3.1 | 3.1 | 3.0 | 3.0 |
| Nominal Elongation at break | 527-2 | % | 4.9 | 5.7 | 8.2 | 12.8 | 24.9 |
| Modulus of Elasticity in tension | 527-2 | MPa | 2290 | 2240 | 2180 | 2050 | 1760 |

TABLE 6-continued

| Component | ISO test specification | Unit | 1 | 2 | 3 | 4 | 5 |
|---|---|---|---|---|---|---|---|
| Flexural Strength (max) | 178 | MPa | 73.0 | 70.9 | 67.1 | 60.0 | 50.5 |
| Yellowness | | | 27.5 | 26.5 | 25.0 | 23.8 | 21.6 |

[2]nf: no fracture

TABLE 7

| Component | ISO test specification | Unit | 1 | 2 | 3 | 4 | 5 |
|---|---|---|---|---|---|---|---|
| A4 | | % | 30 | 29.4 | 28.5 | 27 | 24 |
| B4 | | % | 70 | 68.6 | 66.5 | 63 | 56 |
| C | | % | 0 | 2 | 5 | 10 | 20 |
| Melt volume ratio (220° C./10 kg) | 1133 | cm$^3$/10 min | 2.7 | 2.7 | 3.4 | 4.8 | 11.6 |
| Vicat softening point VST/B/50 | 306 | ° C. | 100.3 | 99.6 | 97.8 | 91.2 | 75 |
| Charpy impact strength at 23° C. | 179/leU | kJ/m$^2$ | 198 | 236 | nd[1] | nd[1] | nd[1] |
| Charpy impact strength at −30° C. | 179/leU | kJ/m$^2$ | 85.5 | 118 | 107 | 135 | 61 |
| Charpy notch impact strength at 23° C. | 179/leA | kJ/m$^2$ | 9.3 | 10.7 | 12.2 | 17.5 | 29.6 |
| Charpy notch impact strength at −30° C. | 179/leA | kJ/m$^2$ | 2.8 | 3.1 | 2.6 | 2.5 | 1.8 |
| IZOD notch impact strength at 23° C. | 180/1A | kJ/m$^2$ | 8.8 | 9.6 | 8.5 | — | — |
| IZOD notch impact strength at −30° C. | 180/1A | kJ/m$^2$ | 3.5 | 3.8 | 3.2 | — | — |
| Elongation at yield stress | 527-2 | % | 3.7 | 3.7 | 3.7 | 3.6 | 3.7 |
| Nominal Elongation at break | 527-2 | % | 12.7 | 14 | 15 | 20.6 | 42 |
| Modulus of Elasticity in tension | 527-2 | MPa | 2180 | 2120 | 2042 | 1920 | 1640 |
| Flexural strength (max) | 178 | MPa | 70.4 | 66.7 | 63.3 | 59.2 | 46.8 |
| Yellowness | | | 42.8 | 43.7 | 42.7 | 43.1 | 39.4 |

[1]not determined

The results show that, even if the amounts of component C are small, there is a rise in impact strength, without (if the amounts are small) any substantial impairment of the other properties of the molding compositions.

TABLE 8

| Component | 1 | 2 |
|---|---|---|
| A3 [%] | 40 | 39.2 |
| B3 [%] | 60 | 58.8 |
| C [%] | — | 2 |
| IZOD notch impact strength at 23° C.[1] [kJ/m$^2$] | 170 | 350 |
| IZOD notch impact strength at 23° C.[2] [kJ/m$^2$] | 350 | 350 |

[1]IZOD notch impact strength perpendicular to extrusion direction
[2]IZOD notch impact strength parallel to extrusion direction A comparison of the IZOD notch impact strengths between molding compositions without addition of component C (1) and those with addition of component C (2) shows a marked improvement in IZOD notch impact strength perpendicular to the extrusion direction with addition of component C.

We claim:

1. A thermoplastic molding composition comprising
   (A) from 5 to 98% by weight, based on the total weight of the molding composition, of an elastomeric graft copolymer built up from
   ($a_1$) from 30 to 90% by weight, based on (A), of a graft base with a glass transition temperature ($T_g$) below −10° C. made from
   ($a_{11}$) an at least partially crosslinked acrylate polymer formed from
   ($a_{111}$) from 50 to 99.9% by weight, based on ($a_{11}$), of at least one $C_1$–$C_{10}$-alkyl acrylate,
   ($a_{112}$) from 0.1 to 5% by weight, based on ($a_{11}$), of at least one polyfunctional crosslinking monomer and
   ($a_{113}$) from 0 to 49.9% by weight, based on ($a_{11}$), of at least one further monomer which is copolymerizable with ($a_{111}$) selected from the group consisting of the vinyl $C_1$–$C_8$-alkyl ethers, butadiene, isoprene, styrene, acrylonitrile and methacrylonitrile, and/or methyl methacrylate and/or
   ($a_{12}$) a diene polymer built up from
   ($a_{121}$) from 60 to 100% by weight, based on ($a_{12}$), of at least one diene and
   ($a_{122}$) from 0 to 40% by weight, based on ($a_{12}$), of further copolymerizable monomers selected from the group consisting of the $C_1$–$C_{10}$-alkyl acrylates, vinyl $C_1$–$C_8$-alkyl ethers, butadine, isoprene, styrene, acrylonitrile and methacrylonitrile, and/or methyl methacrylate,
   ($a_2$) from 10 to 70% by weight, based on (A), of a graft with a ($T_g$) above 50° C., grafted onto the graft base an built up from
   ($a_{21}$) from 50 to 95% by weight, based on ($a_2$), of at least one vinylaromatic monomer,
   ($a_{22}$) from 5 to 50% by weight, based on ($a_2$), of at least one polar, copolymerizable comonomer selected from the group consisting of acrylonitrile, methacrylonitrile, $C_1$–$C_4$-alkyl (meth)acrylates, maleic anhydride and maleimides, and (meth) acrylamide, and/or vinyl $C_1$–$C_8$-alkyl ethers, or a mixture of these,
   (B) from 1 to 90% by weight, based on the total weight of the molding composition, of a copolymer composed of
   ($b_1$) from 50 to 99% by weight, based on (B), of at least one vinylaromatic monomer and
   ($b_2$) from 1 to 50% by weight, based on (B), of monomers as described for ($a_{22}$),
   (C) from 1 to 70% by weight, based on (A), (B), (C) and optionally (D), of a block copolymer composed of at least one block $C_A$ forming a hard phase and having copolymerized units of a vinylaromatic monomer and at least one elastomeric block $C_{(B/A)}$ forming a soft phase and having copolymerized units of a vinylaromatic monomer, and also of a diene, where the glass transition temperature ($T_g$) of the block $C_A$ is above 25° C. and that of the block $C_{(B/A)}$ is below 25° C., and the selected phase-volume ratio of block $C_A$ to block $C_{(B/A)}$ is such that the proportion of the hard phase in the entire block copolymer is from 1 to 40% by volume and the proportion by weight of the diene in the entire block copolymer is less than 50% by weight, where the proportion of 1,2-linkages in copolymerized diene units, based on the total of 1,2- and 1,4-cis/trans linkages of the copolymerized diene units, is below 15%, and (D) from 0 to 300% by weight, based on the weight of components (A) to (C), of a polycarbonate, (E) from 0 to 30% by weight, based on the total weight of the molding composition, of conventional additives and processing aids.

2. A thermoplastic molding composition as claimed in claim 1, where a graft copolymer with a graft base ($a_{12}$) is used as component (A).

3. A thermoplastic molding composition as claimed in claim 1, wherein the glass transition temperature $T_g$ of the block $C_A$ in component is above 50° C. and that of the block $C_{(B/A)}$ is below 5° C.

4. A thermoplastic molding composition as claimed in claim 1, wherein the vinylaromatic monomer in component (C) has been selected from the group consisting of styrene, α-methylstyrene, vinyltoluene, 1,1-diphenylethylene and mixtures of these compounds, and the diene has been selected from the group consisting of butadiene, isoprene, piperylene, 1-phenylbutadiene and mixtures of these compounds.

5. A thermoplastic molding composition as claimed in claim 1, in which component (C) has one of the formulae 1 to 11:

$$(C_A\text{-}C_{(B/A)})_n \quad (1)$$

$$(C_A\text{-}C_{(B/A)})_n\text{-}C_A \quad (2)$$

$$C_{(B/A)}\text{-}(C_A\text{-}C_{(B/A)})_n \quad (3)$$

$$X\text{-}[(C_A\text{-}C(B/A))_n]_{m+1} \quad (4)$$

$$X\text{-}[(C_{(B/A)}\text{-}C_A)_n]_{m+1} \quad (5)$$

$$X\text{-}[(C_A\text{-}C_{(B/A)})_n\text{-}C_A]_{m+1} \quad (6)$$

$$X\text{-}[(C_{(B/A)}\text{-}C_A)_n\text{-}C_{(B/A)}]_{m+1} \quad (7)$$

$$Y\text{-}[(C_A\text{-}C_{(B/A)})_n]_{m+1} \quad (8)$$

$$Y\text{-}[(C_{(B/A)}\text{-}C_A)_n]_{m+1} \quad (9)$$

$$Y\text{-}[(C_A\text{-}C_{(B/A)})_n\text{-}C_A]_{m+1} \quad (10)$$

$$Y\text{-}[(C_{(B/A)}\text{-}C_A)_n\text{-}C_{(B/A)}]_{m+1} \quad (11)$$

where $C_A$ is the vinylaromatic block and $C_{(B/A)}$ is the soft phase, i.e. the block built up randomly from diene units and from vinylaromatic units, X is the residue of an n-functional initiator, Y is the residue of an m-functional coupling agent, and m and n are natural numbers from 1 to 10.

6. A process for preparing thermoplastic compositions as claimed in claim 1, which comprises mixing the components (A) to (C) and optionally (D) and (E).

7. A method of producing films comprising the step of extrusion, rolling, calandering a thermoplastic molding composition as claimed in claim 1.

8. A method of producing three-dimensional moldings comprising the step of injection molding a thermoplastic molding compositions as claimed in claim 1.

9. The thermoplastic molding composition defined in claim 1, wherein the proportion of 1,2-linkages in the copolymerized diene units, based on the total of 1,2- and 1,4-cis/trans linkages of the copolymerized diene units, is below 12%.

10. The thermoplastic molding composition defined in claim 9, wherein the proportion of 1,2-linkages in the copolymerized diene units, based on the total of 1,2- and 1,4-cis/trans linkages of the copolymerized diene units, is of from 9 to 11%.

11. A thermoplastic molding composition comprising (A) from 5 to 98% by weight, based on the total weight of the molding composition, of at least one elastomeric graft copolymer built up from ($a_1$) from 30 to 90% by weight, based on (A), of a graft base with a glass transition temperature ($T_g$) below −10° C. made from ($a_{11}$) an at least partially crosslinked acrylate polymer formed from ($a_{111}$) from 50 to 99.9% by weight, based on ($a_{11}$), of at least one $C_1$–$C_{10}$-alkyl acrylate, ($a_{112}$) from 0.1 to 5% by weight, based on ($a_{11}$), of at least one polyfunctional crosslinking monomer and ($a_{113}$) from 0 to 49.9% by weight, based on ($a_{11}$), of a least one further monomer which is copolymerizable with ($a_{111}$) selected from the group consisting of the vinyl $C_1$–$C_8$-alkyl ethers, butadiene, isoprene, styrene, acrylonitrile and methacrylonitrile, and/or methyl methacrylate and/or ($a_{12}$) a diene polymer built up from ($a_{121}$) from 60 to 100% by weight, based on ($a_{12}$), of at least one diene and ($a_{122}$) from 0 to 40% by weight, based on ($a_{12}$), of further copolymerizable monomers selected from the group consisting of the $C_1$–$C_{10}$-alkyl acrylates, vinyl $C_1$–$C_8$-alkyl ethers, butadiene, isoprene, styrene, acrylonitrile and methacrylonitrile, and/or methyl methacrylate, ($a_2$) from 10 to 70% by weight, based on (A), of a graft with a glass transition temperature ($T_g$) above 50° C., grafted onto the graft base and built up from ($a_{21}$) from 65 to 95% by weight, based on ($a_2$), of at least one vinylaromatic monomer, ($a_{22}$) from 5 to 35% by weight, based on ($a_2$), of at least one polar, copolymerizable comonomer selected from the group consisting of acrylonitrile, methacrylonitrile, $C_1$–$C_4$-alkyl (meth)acrylates, maleic anhydride and maleimides, and (meth) acrylamide, and/or vinyl $C_1$–$C_8$-alkyl ethers, or a mixture of these, (B) from 1 to 90% by weight, based on the total weight of the molding composition, of a copolymer composed of ($b_1$) from 69 to 81% by weight, based on (B), of at least one vinylaromatic monomer and ($b_2$) from 19 to 31% by weight, based on (B), of monomers as described for ($a_{22}$), (C) from 1 to 70% by weight, based on (A), (B), (C) and optionally (D) and (E), of an elastomeric block copolymer composed of at least one block $C_A$ forming a hard phase and having copolymerized units of a vinylaromatic monomer, and at least one elastomeric block $C_{(B/A)}$ forming a soft phase and having copolymerised units of a vinylaromatic monomer, and also of a diene, where the glass transition temperature ($T_g$) of the block $C_A$ is above 25° C. and that of the block $C_{(B/A)}$ is below 25° C., and the selected phase-volume ratio of block $C_A$ to block $C_{(B/A)}$ is such that the proportion of the hard phase in the entire block copolymer is from 1 to 40% by volume and the proportion by weight of the diene in the entire block copolymer is less than 50% by weight, where the proportion of 1,2-linkages in copolymerized diene units, based on the total of 1,2- and 1,4-cis/trans linkages in the copolymerized diene units, is below 15%, and (D) from 0 to 300% by weight, based on the weight of components (A) to (C), of a polycarbonate, of S-MA copolymers (styrenemaleic acid copolymers), of S-imide-MA copolymers (styreneimide-maleic anhydride copolymers), of S-imide-AN-MA copolymers (styrene-imide-acrylonitrilemaleic anhydride copolymers), of a polymethacrylamide, or of a polymethacrylate, and (E) from 0 to 30% by weight, based on the total weight of the molding composition, of conventional additives and processing aids.

12. A thermoplastic molding composition as claimed in claim 11, wherein the proportion of component (C) is from 0.1 to 15% by weight, based on (A), (B), (C) and optionally (D) and (E).

13. A thermoplastic molding composition as claimed in claim 1, where a graft copolymer with a graft base ($a_{12}$) is used as component (A).

14. A thermoplastic molding composition as claimed in claim 11, wherein the glass transition temperature $T_g$ of the block $C_A$ in component is above 50° C. and that of the block $C_{(B/A)}$ is below 5° C.

15. A thermoplastic molding composition as claimed in claim 11, wherein the vinyl aromatic monomer in component (C) has been selected from the group consisting of styrene, α-methylstyrene, vinyltoluene, 1,1-diphenylethylene and mixtures of these compounds, and the diene has been selected from the group consisting of butadiene, isoprene, piperylene, 1-phenylbutadiene and mixtures of these compounds.

16. A thermoplastic molding composition as claimed in claim 11, in which component (C) has one of the formulae 1 to 11:

  (1)

  (2)

  (3)

  (4)

  (5)

  (6)

  (7)

  (8)

  (9)

  (10)

  (11)

where $C_A$ is the vinyl aromatic block and $C_{(B/A)}$ is the soft phase, i.e. the block built up randomly from diene units and from vinylaromatic units, X is the residue of an n-functional initiator, Y is the residue of an m-functional coupling agent, and m and n are natural numbers from 1 to 10.

17. A process for preparing thermoplastic molding compositions as claimed in claim 11, which comprises mixing the components (A) to (C) and optionally (D) and (E).

18. A method of producing films comprising the step of extrusion, rolling, calandering a thermoplastic molding composition as claimed in claim 11.

19. A method of producing three-dimensional moldings comprising the step of injection molding a thermoplastic molding as claimed in claim 11.

20. The thermoplastic molding composition defined in claim 11, wherein the proportion of 1,2-linkages in the copolymerized diene units, based on the total of 1,2- and 1,4-cis/trans linkages of the copolymerized diene units, is below 12%.

21. The thermoplastic molding composition defined in claim 20, wherein the proportion of 1,2-linkages in the copolymerized diene units, based on the total of 1,2- and 1,4-cis/trans linkages of the copolymerized diene units, is of from 9 to 11%.

* * * * *

UNITED STATES PATENT AND TRADEMARK OFFICE
CERTIFICATE OF CORRECTION

PATENT NO.    : 6,579,937 B1
DATED         : June 17, 2003
INVENTOR(S)   : Guentherberg et al.

It is certified that error appears in the above-identified patent and that said Letters Patent is hereby corrected as shown below:

Title page,
Item [57], ABSTRACT,
Line 6, "(A) though (D)" should be -- (A) through (D) --.

Column 24,
Line 49, "an built" should be -- and built --.

Column 26,
Line 26, "$(a_{1111})$" should be -- $(a_{111})$ --.

Signed and Sealed this

Twelfth Day of August, 2003

JAMES E. ROGAN
*Director of the United States Patent and Trademark Office*